Feb. 6, 1968   W. F. MERRIWEATHER   3,367,707
CONVERTIBLE TRUNK GUARD
Filed April 16, 1965   3 Sheets-Sheet 1

INVENTOR.
WILLIE F. MERRIWEATHER
BY
Donnelly, Mentag & Harrington
ATTORNEYS

Feb. 6, 1968 W. F. MERRIWEATHER 3,367,707
CONVERTIBLE TRUNK GUARD
Filed April 16, 1965
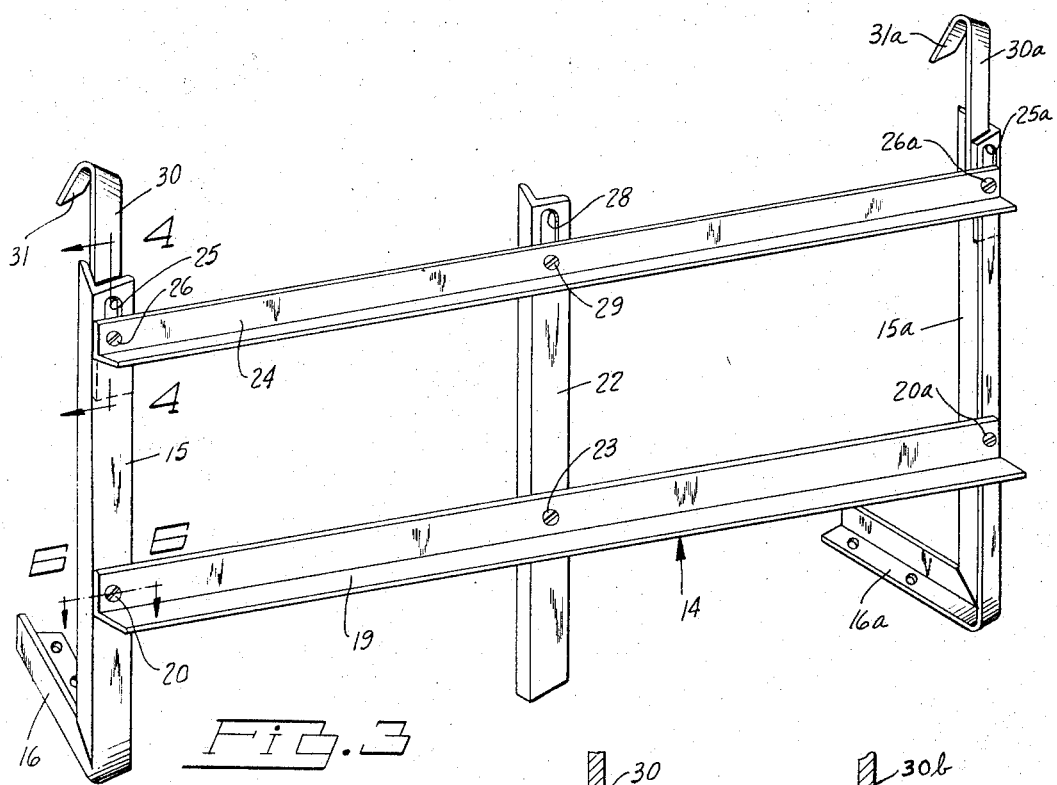
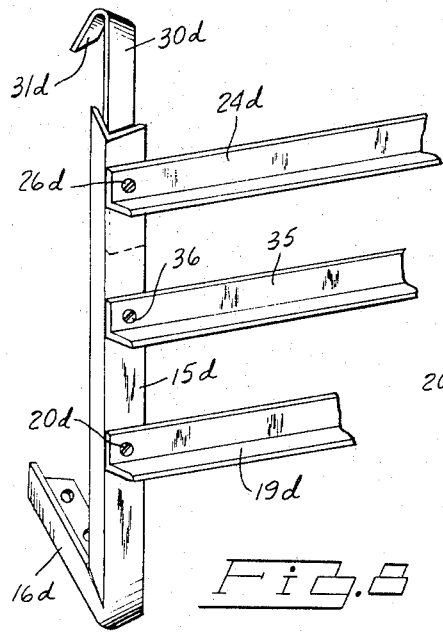
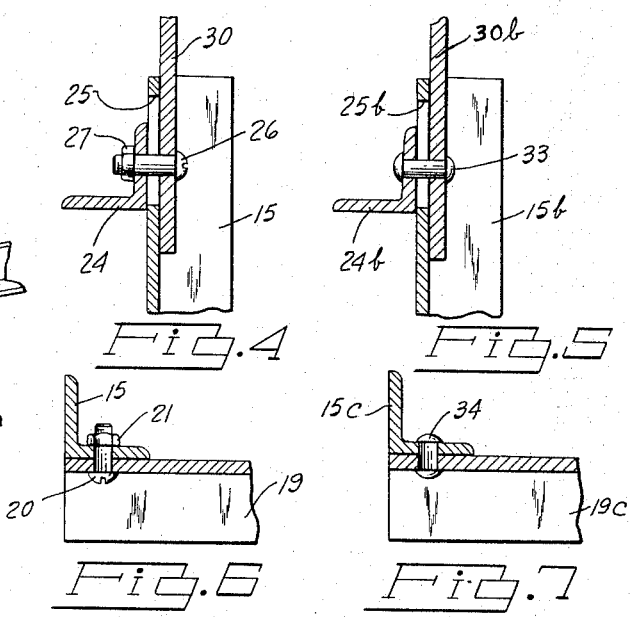
INVENTOR.
WILLIE F. MERRIWEATHER
BY
Donnelly, Mentag & Harrington
ATTORNEYS Feb. 6, 1968   W. F. MERRIWEATHER   3,367,707
CONVERTIBLE TRUNK GUARD
Filed April 16, 1965   3 Sheets-Sheet 3

INVENTOR.
WILLIE F. MERRIWEATHER
BY
Donnelly, Mentag & Harrington
ATTORNEYS

United States Patent Office 3,367,707
Patented Feb. 6, 1968

3,367,707
CONVERTIBLE TRUNK GUARD
Willie F. Merriweather, 8527 Dexter,
Detroit, Mich. 48206
Filed Apr. 16, 1965, Ser. No. 448,655
3 Claims. (Cl. 296—24)

ABSTRACT OF THE DISCLOSURE

A convertible auto trunk guard disposed between the front end of the trunk and the convertible top storage compartment to prevent theft from the trunk by access through said storage compartment.

---

This invention relates generally to automobile trunk guards, and more particularly, to a novel trunk guard especially adapted for use in the trunk of a convertible automobile.

A convertible automobile offers many advantages which increase the pleasure of driving an automobile. However, a convertible automobile has an inherent disadvantage because of its construction which subjects the owner of the convertible to the hazard or risk of theft from the trunk of the convertible automobile because of access to the trunk provided by the convertible "boot." The boot is a compartment formed immediately forward of the convertible trunk and in which is seated the convertible top when it is in the lowered position. The boot compartment may be separated from the automobile trunk by a wall made from a pressed paper material or fiber material and which is easily pushed down or broken through. Heretofore, many owners of convertible automobiles have had articles stolen from the convertible automobile trunk, as for example, spare tires, golf clubs, clothing and so forth, because of access into the trunk through the boot compartment. A person wishing to gain access into the convertible trunk can do so by slitting the plastic rear window of the convertible top.

In view of the foregoing, it is an important object of the present invention to provide a novel convertible automobile trunk guard which is adapted to guard against and eliminate the risk of loss by theft from the trunk because of access to the trunk through the convertible boot compartment.

It is another object of the present invention to provide a convertible automobile trunk guard which is adapted to prevent theft from the trunk through the boot compartment and to accomplish this result without substantially reducing the storage space in the convertible boot compartment.

It is a further object of the present invention to provide a convertible trunk guard which is simple and compact in construction, economical of manufacture, and efficient in operation.

It is still another object of the present invention to provide a novel convertible automobile trunk guard which can be quickly and easily installed and which can be removed only from the trunk entrance of the automobile and thus eliminate entry into the trunk through the rear window of the convertible.

It is still another object of the present invention to provide an improved combination of a convertible trunk in which is mounted a guard means at the forward end thereof to prevent entry into the trunk through the convertible boot compartment.

Other objects, features and advantages of this invention will be apparent from the following detailed description, appended claims, and the accompanying drawings.

In the drawings:

FIG. 3 is an elevational, perspective view of the convertible trunk guard illustrated in FIG. 1;

FIG. 4 is fragmentary, enlarged, elevational section view of the structure illustrated in FIG. 3, taken along the line 4—4 thereof, and looking in the direction of the arrows;

FIG. 5 is a view similar to FIG. 4 and showing a modification of the structure of FIG. 4;

FIG. 6 is a fragmentary, enlarged, horizontal sectional view of the structure illustrated in FIG. 3, taken along the line 6—6 thereof, and looking in the direction of the arrows;

FIG. 7 is a view similar to FIG. 6 showing a modification of the structure of FIG. 6;

FIG. 8 is a fragmentary, elevational section view of a slight modification of the structure illustrated in FIG. 3;

Figures 1, 2:
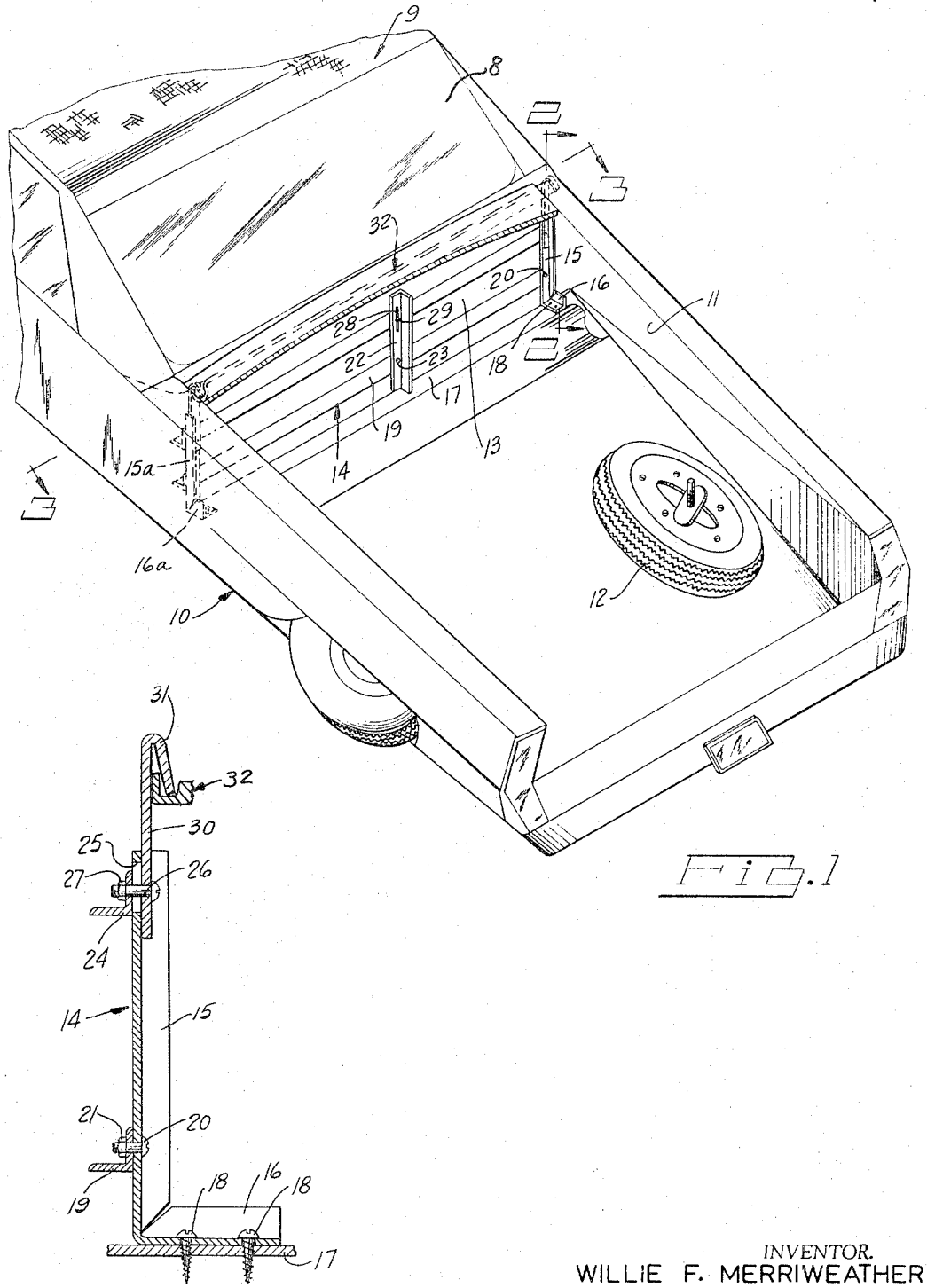
FIG. 1 is a fragmentary, perspective view of the rear end of a convertible automobile, with the trunk cover removed, and showing an illustrative embodiment of the trunk guard of the present invention mounted in an operative position in the forward end of the trunk.
FIG. 2 is an enlarged, elevational sectional view of the structure illustrated in FIG. 1, taken along the line 2—2 thereof, and looking in the direction of the arrows.

Referring now to FIG. 1, the numeral 10 generally indicates a convertible automobile having a trunk compartment 11 in which is normally mounted a spare tire 12. The trunk cover has been removed for purposes of clarity. It will be understood that the trunk guard of the present invention is adapted for use on other types of convertible automobiles besides the illustrative automobile shown in FIG. 1.

The numeral 9, in FIG. 1, generally designates the convertible top which is provided with a rear window indicated by the numeral 8. The space or compartment immediately forward of the trunk 11 is designated by the numeral 13 and is generally called the "boot" of the convertible. The top 9 is folded into the boot compartment 13 when the top 9 is moved to the lowered position. The boot compartment 13 may, or may not be, divided or separated from the trunk 11 by a dividing wall made from a pressed paper material, or the like. Such a dividing wall is usually a flimsy or weak wall which can be easily pushed aside to provide access to the trunk 11 through the boot compartment 13. Heretofore, many convertible automobile owners have suffered losses from the trunk because of access through the boot compartment and this is a common type of theft in which many thieves specialize.

The illustrative embodiment of the convertible trunk guard shown in FIG. 1 is generally indicated by the numeral 14 and comprises a pair of spaced apart vertically disposed support members 15 and 15a which are shown in the form of upright angle irons. As best seen in FIG. 2, the upright angle iron 15 is provided with an integral foot portion 16 which is disposed substantially perpendicular to the main upright portion of the angle iron and which acts as a connection bracket for securing the angle iron 15 to the trunk floor 17 of the automobile. The connection bracket 16 may be secured to the trunk floor 17, by any suitable means, as for example, by the screws 18. The support member 15a is formed in a similar manner.

As shown in FIGS. 1, 2 and 3, the guard 14 further includes a lower, horizontally disposed cross member shown in the form of a horizontally disposed angle iron 19. The cross member 19 is adapted to be secured to the upright support members 15 and 15a, by any suitable means, as by bolt 20 and nut 21. It will be seen that the structure of the guard 14 is the same at each end thereof and the corresponding parts of the support members 15 and 15a have been marked with similar reference numerals followed by the small letter "a." As shown in FIGS. 1 and 3, the guard 14 further includes an intermediate or central, vertically disposed brace 22 which is adapted to extend downwardly to a point adjacent the trunk floor 17 and to be connected to a cross member 19, by any suitable means, as by a bolt and nut combination indicated by the numeral 23.

As shown in FIGS. 1, 2 and 3, the guard 14 is provided with an upper cross member indicated by the numeral 24 which has the ends secured to the upright support members 15 and 15a by bolts 26 and nuts 27. The cross member 24 is shown in the form of an angle iron and is secured to the central brace 22 by a suitable bolt and nut combination indicated by the numeral 29. As best seen in FIG. 3, the central brace 22 is provided with a vertically disposed slot 28 through which the bolt 29 passes and which permits vertical adjustment of the cross member 24 relative to the brace 22. As best seen in FIG. 2, the upright support member 15 is also provided with a vertically disposed slot 25 to permit vertical adjustment of the end of the cross member 24. The upright support member 15a is provided with a similar slot 25a. Although the cross members 19 and 24, and the vertical brace 22 are shown as angle irons, it will be understood that any other suitable structural members may be used.

The upper end of the guard 14 is secured to the automobile by the following described structure. As shown in FIGS. 1 and 2, a convertible type automobile is provided with a transverse panel which includes a transverse rain trough on the front edge thereof, generally indicated by the numeral 32. The upper end of the guard 14 may be quickly and easily secured in place in the trunk 11 by providing a pair of attachment members for securing the guard 14 to said rain trough 32. As best seen in FIG. 2, an attachment strap 30 has the lower end thereof secured to the upper end of the upright support member 15 by means of the bolt 26. The attachment member upper end 31 is bent over to form a hook which is adapted to be mounted over the lip of the substantially U-shaped rain trough 32. It will be understood, that after the attachment hook portion 31 has been mounted over the lip of the trough 32, the screw 26 would be secured in place by the nut 27. As shown in FIG. 1, the upright support member 15a is secured in a similar manner to the transversely disposed rain trough 32.

FIG. 5 shows a slight modification of the means for securing the attachment bracket strap or arm 30 to the upright support members 15. In this embodiment, a rivet 33 has been used instead of the bolt and nut arrangement 26 and 27 of FIGS. 1 through 4. The parts of the guard structure similar to the first embodiment are marked with the same reference numerals followed by the small letter "b." The rivet 33 is of the type which exerts a sufficient pressure to maintain the cross member 24b in position relative to the upright support member 15b, but permits adjustment of the parts 24b and 30b upwardly or downwardly, as desired.

FIG. 7 shows a slightly modified embodiment of the structure for attaching the lower cross member 19 to the upright support members 15 and 15a. As shown in FIG. 7, the bolt and nut means 20 and 21 have been replaced with a rivet 34. The guard parts similar to the parts shown in FIGS. 1 through 3, have been marked with the same reference numerals followed by the small letter "c."

FIG. 8 shows a further modification of the guard structure of FIGS. 1 through 4. In the embodiment of FIG. 8, the guard parts similar to the parts shown in FIGS. 1 through 4, have been marked with the same reference numerals followed by the small letter "d." The guard structure of FIG. 8 includes an intermediate cross member 35, shown in the form of an angle iron, secured to the upright 15d by any suitable means, as by the bolt and nut means 36. The attachment arm 30d which carries the attachment hook 31d is also secured to the upright 15d by the bolt 26d without the provision of the elongated slot 25. It will be seen that the addition of the intermediate cross member 35 provides additional strength to the guard and makes it more difficult for objects to be removed through the guard in case the trunk has some small objects disposed therein.

Figure 9:
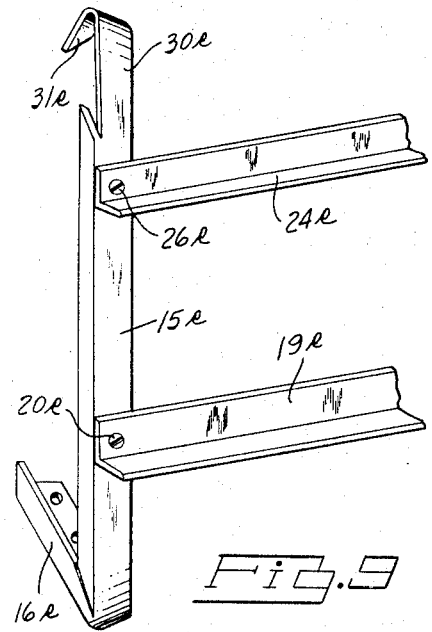
FIG. 9 is a fragmentary, elevational view of another modification of the structure illustrated in FIG. 3.

FIG. 9 is still another modification of the basic guard structure shown in FIGS. 1 through 4. In this embodiment, the parts of the guard which are the same as the first embodiment of FIGS. 1 through 4, have been marked with the same reference numerals followed by the small letter "e." In the embodiment of FIG. 9, the upright member 15e is integrally connected to the lower end of the attachment strap 30e.

Figure 10:
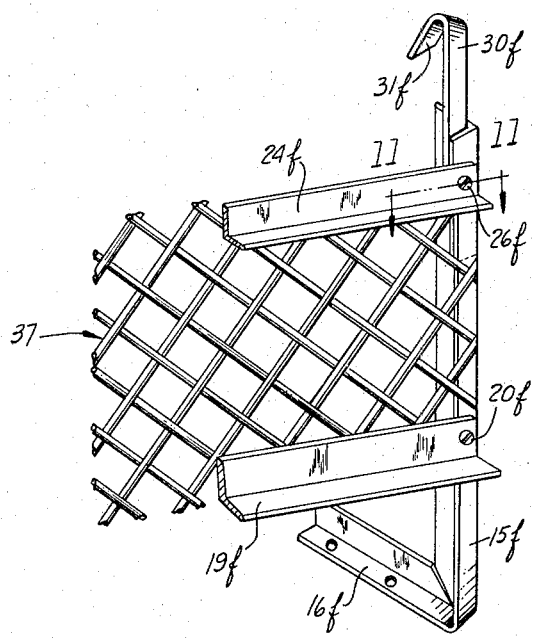
FIG. 10 is a fragmentary, elevational view of a further modification of the structure illustrated in FIG. 3.
Figure 11:
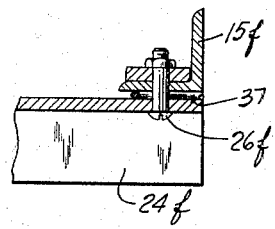
FIG. 11 is a fragmentary, enlarged, horizontal sectional view of the structure illustrated in FIG. 10, taken along the line 11—11 thereof, and looking in the direction of the arrows; and, FIG. 12 is a fragmentary, broken, elevational perspective view of still another embodiment of the invention.

FIGS. 10 and 11 show a further modification of the guard 14 of FIGS. 1 through 4. The parts of the guard of FIG. 10 which are similar to the first embodiment of FIGS. 1 through 4, have been marked with the same reference numerals followed by the small letter "f." In the embodiment of FIGS. 10 and 11, the attachment arm 30 is formed in the same manner as FIG. 8, that is, without the adjustment slot 25. A further difference is that a wire mesh material 37 has been mounted between the vertical support members 15 and in a position between the cross members 19f and 24f to further deter access into the automobile trunk through openings in the guard. It will be understood that the wall material 37 may be of any suitable type as, for example, it may be made from a solid type material such as wood, metal or plastic, and it may extend downwardly to the trunk floor 17 and upwardly to the transverse trough 32, if desired.

Figure 12:
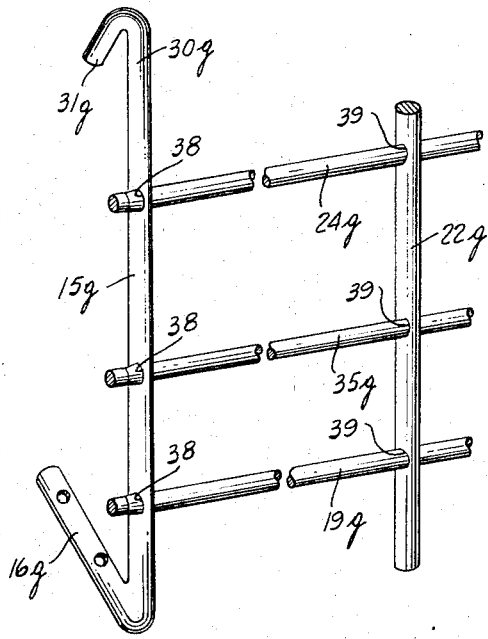

FIG. 12 shows another embodiment of the invention in which the cross members 19, 24 and 25, the vertical support members 15, and the central brace 22 have been made from a differently shaped workpiece. The parts of the guard shown in FIG. 12 which are similar to the parts of the embodiment of FIGS. 1 through 4 and the embodiment of FIG. 8, have been marked with corresponding reference numerals followed by the small letter "g." In the embodiment of FIG. 12 the cross members 19, 24 and 25 have been made from round bar stock and the upright support members 15 and brace 22 have also been made from round bar stock. The attachment members 31 and 31g are shown as integrally formed on the upper end of the upright support member 15g. The attachment bracket 16g is also integrally formed on the lower end of the upright support member 15g. The outer ends of the cross members 19g, 24g and 35g are seated in suitable holes 38 formed through the upright members 15g. The cross members may be welded to the vertical members 15g or secured thereto by any other suitable means. The cross members 19g, 24g and 35g also pass through suitable holes 39 formed through the vertical brace 22g.

In use the guard of the present invention may be made to any size and shape to fit a particular automobile trunk in which it is to be mounted. It will be seen that the adjustable attachment means of the first embodiment of FIGS. 1 through 4 permits the user to quickly and easily install the guard in an automobile trunk. The provision of more than two cross members and a vertical wall member, as 37 shown in FIG. 10, further deters entrance into an automobile trunk. It will also be seen that the various parts of the guard 14 may be secured to each other by welding, and that the guard may be welded to the trough 32 and the floor 17 of the trunk, if desired. It will be understood that the guard of the present invention will be disposed on the trunk side of the aforementioned pressed paper transverse wall which is found in some automobiles, whereby a thief seeking to gain access into the trunk by pushing backwards on such wall would be prevented from doing so by the guard. If he then moves said wall forwardly in some manner, he would still be prevented from gaining access into the trunk by the guard 14. It will also be understood that in some model automobiles the connection bracket 16 may be deleted and the part 15 attached directly to the trunk 17. Actual experience has shown that the guard of the present invention is a practical and economical structure for preventing theft from the trunk of a convertible automobile.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. In a convertible automobile having a car body with a passenger compartment, a trunk compartment having a top wall and opening forwardly, and a boot compartment for holding a retractible top at the front end of the trunk compartment with said boot compartment opening into said passenger compartment, the combination comprising:
   (a) a trunk guard disposed between the front end of said trunk compartment and said boot compartment;
   (b) said guard comprising a substantially rigid barrier extending the length and height of the open end of said trunk compartment, and including means preventing ready access therethrough;
   (c) said barrier having a foot portion means at the lower edge thereof extending into said trunk compartment and fastening means fastening said foot portion means to the floor of said trunk compartment, said fastening means being accessible only from said trunk compartment; and
   (d) further means for fastening the top of said barrier to the top wall of said trunk compartment.

2. A structure as set forth in claim 1, wherein said further means (d) comprises at least two hook members secured to said barrier, said hook members being hooked on the body of said automobile.

3. A structure as set forth in claim 2, wherein said hook members are slidably connected to said barrier for vertical adjustment relative thereto by a fastening means, said fastening means being accessible only from said trunk compartment.

References Cited

UNITED STATES PATENTS

| 1,953,953 | 4/1934 | Carr | 296—37.2 X |
| 2,595,329 | 5/1952 | Brooks | 280—150 |
| 2,997,331 | 8/1961 | Kudner | 296—24 |
| 3,044,821 | 7/1962 | Wicker | 296—24 |
| 3,169,781 | 2/1965 | Abruzzino | 280—150 |
| 3,272,551 | 9/1966 | Walker | 296—37 |

BENJAMIN HERSH, *Primary Examiner.*

PHILIP GOODMAN, *Examiner.*